US008666821B2

(12) United States Patent
Xie et al.

(10) Patent No.: US 8,666,821 B2
(45) Date of Patent: Mar. 4, 2014

(54) SELECTING ADVERTISEMENTS BASED ON SERVING AREA AND MAP AREA

(75) Inventors: Xing Xie, Beijing (CN); Xianfang Wang, Beijing (CN); Ying Li, Bellevue, WA (US); Wei-Ying Ma, Beijing (CN); Lee Wang, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1945 days.

(21) Appl. No.: 11/467,810

(22) Filed: Aug. 28, 2006

(65) Prior Publication Data

US 2008/0052151 A1 Feb. 28, 2008

(51) Int. Cl.
 G06Q 30/00 (2012.01)
 G06F 7/00 (2006.01)
 G06F 17/30 (2006.01)
(52) U.S. Cl.
 USPC ............... 705/14.73; 705/14.54; 705/14.64; 707/723; 707/735; 707/748
(58) Field of Classification Search
 USPC ............... 705/14, 14.54, 14.64, 14.69, 14.73; 707/723, 735, 748
 See application file for complete search history.

(56) References Cited

U.S. PATENT DOCUMENTS

| | | | |
|---|---|---|---|
| 4,780,717 A * | 10/1988 | Takanabe et al. | 340/995.16 |
| 5,948,040 A * | 9/1999 | DeLorme et al. | 701/201 |
| 6,338,096 B1 | 1/2002 | Ukelson | |
| 6,629,136 B1 | 9/2003 | Naidoo | |
| 6,731,612 B1 | 5/2004 | Koss | |
| 6,885,860 B2 | 4/2005 | Bahl et al. | |
| 6,983,311 B1 | 1/2006 | Haitsuka et al. | |
| 7,158,780 B2 | 1/2007 | Bahl et al. | |
| 7,231,405 B2 | 6/2007 | Xia | |
| 7,257,570 B2 | 8/2007 | Riise et al. | |
| 7,257,577 B2 | 8/2007 | Fagin et al. | |
| 7,574,530 B2 | 8/2009 | Wang et al. | |
| 7,606,875 B2 | 10/2009 | Xie et al. | |
| 7,650,431 B2 | 1/2010 | Wang et al. | |
| 7,792,870 B2 | 9/2010 | Field et al. | |
| 2001/0013013 A1* | 8/2001 | Takenaga | 705/14 |
| 2002/0013729 A1* | 1/2002 | Kida | 705/14 |
| 2002/0032035 A1* | 3/2002 | Teshima | 455/456 |
| 2002/0059646 A1 | 5/2002 | Kim | |
| 2002/0095333 A1* | 7/2002 | Jokinen et al. | 705/14 |
| 2002/0107027 A1* | 8/2002 | O'Neil | 455/456 |
| 2002/0119788 A1 | 8/2002 | Parupudi et al. | |

(Continued)

OTHER PUBLICATIONS

"city-data.com," http://www.city-data.com [last accessed Feb. 23, 2007].

(Continued)

*Primary Examiner* — John G Weiss
*Assistant Examiner* — Adam Chornesky
(74) *Attorney, Agent, or Firm* — Carole Boelitz; Micky Minhas (57) ABSTRACT

Methods and systems for selecting advertisements to present to a user of a computing device are provided. An advertisement system selects advertisements to display to a user based on the serving area of candidate advertisements. The advertisement system selects those candidate advertisements whose serving area encompasses the user's current location. The advertisement system may also select candidate advertisements to present to a user based on a map area currently being displayed to the user. The advertisement system may filter the candidate advertisements based on the provider location being within the map area that is currently being displayed to the user.

18 Claims, 8 Drawing Sheets

(56) References Cited

U.S. PATENT DOCUMENTS

| | | | |
|---|---|---|---|
| 2002/0156779 | A1 | 10/2002 | Elliott et al. |
| 2003/0182195 | A1 | 9/2003 | Kumar |
| 2003/0216930 | A1 | 11/2003 | Dunham et al. |
| 2004/0204842 | A1* | 10/2004 | Shinozaki ............... 701/209 |
| 2004/0225562 | A1 | 11/2004 | Turner |
| 2005/0021403 | A1 | 1/2005 | Ozer et al. |
| 2005/0065916 | A1 | 3/2005 | Ge et al. |
| 2005/0065959 | A1 | 3/2005 | Smith et al. |
| 2005/0085959 | A1 | 4/2005 | Feyereisen |
| 2005/0136949 | A1* | 6/2005 | Barnes, Jr. ............... 455/461 |
| 2005/0195219 | A1 | 9/2005 | Hirono |
| 2005/0216547 | A1 | 9/2005 | Foltz-Smith et al. |
| 2006/0059225 | A1 | 3/2006 | Stonehocker et al. |
| 2006/0143266 | A1 | 6/2006 | Ohto et al. |
| 2006/0206624 | A1 | 9/2006 | Wang et al. |
| 2006/0212350 | A1 | 9/2006 | Ellis et al. |
| 2006/0235875 | A1 | 10/2006 | Wen et al. |
| 2006/0241859 | A1* | 10/2006 | Kimchi et al. ............. 701/208 |
| 2006/0242009 | A1* | 10/2006 | Crolley .................... 705/14 |
| 2006/0271281 | A1* | 11/2006 | Ahn et al. ................. 701/208 |
| 2006/0271531 | A1 | 11/2006 | O'Clair et al. |
| 2006/0282455 | A1 | 12/2006 | Lee et al. |
| 2007/0088687 | A1 | 4/2007 | Bromm et al. |
| 2007/0088852 | A1* | 4/2007 | Levkovitz ............... 709/246 |
| 2007/0192164 | A1 | 8/2007 | Nong et al. |
| 2007/0233864 | A1 | 10/2007 | Xie et al. |
| 2008/0052413 | A1 | 2/2008 | Wang et al. |
| 2008/0134042 | A1 | 6/2008 | Jankovich |
| 2010/0010945 | A1 | 1/2010 | Wang et al. |

OTHER PUBLICATIONS

"Geographic Names Information System (GNIS)," http://geonames.usgs.gov/, [last accessed Feb. 23, 2007].

"Google Local Search," http://www.google.com/local, [last accessed Feb. 23, 2007].

"MSN Local Search and Microsoft MapPoint," http://mappoint.msn.com, [last accessed Feb. 23, 2006].

"North American Numbering Plan," http://sd.wareonearth.com/~phil/npanxx, [last accessed Feb. 23, 2007].

"Open Directory Project," http://dmoz.org/, [last accessed Feb. 23, 2007].

"SPIRIT project," http://www.geo-spirit.org, [last accessed Feb. 23, 2006].

"USPS—The United States Postal Services," http://www.usps.com, [last accessed Feb. 23, 2007].

"Yahoo Directory," http://dir.yahoo.com/, [last accessed Feb. 13, 2007].

"Yahoo Local," http://local.yahoo.com, [last accessed Feb. 26, 2007].

"Yahoo Regional," http://www.yahoo.com/regional, [last accessed Feb. 13, 2007].

Amitay, Einat et al., "Web-a-where: Geotagging Web Content," SIGIR'04, Sheffield, South Yorkshire, UK, © 2004 ACM, pp. 273-280.

Beckmann, Norbert et al., "The R-tree: An Efficient and Robust Access Method for Points and Rectangles," Proceedings of the 1990 ACM SIGMOD International Conference on Management of Data, Atlantic City, New Jersey, © 1990 ACM, pp. 322-331.

Brin, Sergey and Lawrence Page, "The Anatomy of a Large-Scale Hypertextual Web Search Engine," 7th WWW, Apr. 1998, 20 pages.

Burges, Christopher J.C., "A Tutorial on Support Vector Machines for Pattern Recognition," Data Mining and Knowledge Discovery, 2, 1998, © 1998 Kluwer Academic Publishers, pp. 121-167.

Buyukkokten, Orkut et al., "Exploiting Geographical Location Information of Web Pages," Proceedings of the ACM SIGMOD Workshop on the Web and Databases, Jun. 1999, pp. 91-96.

Chakrabarti, Soumen et al., "Enhanced hypertext categorization using hyperlinks," ACM SIGMOD 1998, Seattle, Washington, 12 pages.

Davison, Brian D., "Topical Locality in the Web: Experiments and Observations," Jul. 2000, Technical Report DCS-TR-414, Department of Computer Science, Rutgers University, pp. 1-22.

Ding, Junyan et al., "Computing Geographical Scopes of Web Resources," Proceedings of the 26th VLDB Conference, Cairo, Egypt, 2000, pp. 545-556.

Dumais, Susan and Hao Chen, "Hierarchical Classification of Web Content," SIGIR 2000, Athens, Greece, © 2000 ACM, pp. 256-263.

Glover, Eric J. et al., "Using Web Structure for Classifying and Describing Web Pages," WWW2002, May 2002, Honolulu, Hawaii, ACM, pp. 562-569.

Gravano, Luis et al., "Categorizing Web Queries According to Geographical Locality," CIKM'03, Nov. 2003, New Orleans, Louisiana, © 2003 ACM, 9 pages.

Guttman, Antonin, "R-Trees: A Dynamic Index Structure for Spatial Searching," © 1984 ACM, pp. 47-57.

Hearst, Marti A., "Trends & Controversies—Support vector machines," IEEE Intelligent Systems, Jul./Aug. 1998, pp. 18-28.

Hill, Linda L. et al., "Geographic Names," D-Lib Magazine, Jan. 1999, vol. 5, Issue 1, 17 pages.

Jones, Matt et al., "Using a Mobile Device to Vary the Pace of Search," Human-Computer Interaction with Mobile Devices and Services, Mobile HCI 2003, Udine, Italy, 2003, © Springer-Verlag Berlin Heidelberg 2003, pp. 390-394.

Kaasinen, Eija, "User needs for location-aware mobile services," Pers Ubiquit Comput, 2003, vol. 7, © Springer-Verlag London Limited 2003, pp. 70-79.

Kosala, Raymond and Hendrik Blockeel, "Web Mining Research: A Survey," SIGKDD Explorations, Jul. 2000, vol. 2, Issue 1, © 2000 ACM SIGKDD, pp. 1-15.

Larson, Ray R., "Geographic Information Retrieval and Spatial Browsing," in GIS and Libraries: Patrons, Maps and Spatial Information, Linda Smith and Myke Gluck, Eds., University of Illinois, 1996, pp. 81-124, available online at http://sherlock.berkeley.edu/geo_ir/PART1.html.

Lee, Fiona et al., "Global Atlas: Calibrating and Indexing Documents from the Internet in the Cartographic Paradigm," 1st International Conference on Web Information Systems Engineering, IEEE Computer Society 2000, Hong Kong, China, © 2000 IEEE, pp. 125-132.

Lee, R. et al., "Optimization of Geographic Area to a Web Page for Two-Dimensional Range Query Processing," 4th International Conference on Web Information Systems Engineering Workshops, Roma, Italy, 2003, © 2004 IEEE, pp. 9-17.

Leutenegger, Scott T. et al., "STR: A Simple and Efficient Algorithm for R-Tree Packing," 13th International Conference on Data Engineering, IEEE Computer Society 1997, Birmingham U.K, pp. 497-506.

Ma, Qiang and Katsumi Tanaka, "Retrieving Regional Information from Web by Contents Localness and User Location," AIRS 2004, LNCS 3411, 2005, © Springer-Verlag Berlin Heidelberg 2005, pp. 301-312.

Ma, Qiang et al., "A Localness-Filter for Searched Web Pages," APWeb 2003, LNCS 2642, © Springer-Verlag Berlin Heidelberg 2003, pp. 525-536.

Markowetz, Alexander et al., "Design and Implementation of a Geographic Search Engine," 8th International Workshop on the Web and Databases, Jun. 2005, Baltimore, Maryland, 6 pages.

McCurley, Kevin S., "Geospatial Mapping and Navigation of the Web," WWW10, May 2001, Hong Kong, ACM, pp. 221-229.

PCT International Search Report, International Application No. PCT/US2007/005393, Applicant: Microsoft Corporation, Mailed on Aug. 29, 2007, 4 pages.

PCT International Search Report, International Application No. PCT/US2007/076909, Applicant: Microsoft Corporation, Mailing Date Jan. 31, 2008, 3 pages.

Platt, John C., "Fast Training of Support Vector Machines using Sequential Minimal Optimization," Chapter 12, Advances in Kernel Methods—Support Vector Learning, B. Schölkopf, C. Burges, and A. Smola, eds., MIT Press, 1999, pp. 185-208.

Pramudiono, Iko et al., "User Behavior Analysis of Location Aware Search Engine," 3rd International Conference on Mobile Data Managemen, Singapore, Jan. 2002, 7 pages.

Sanderson, Mark and Janet Kohler, "Analyzing geographic queries," In Proceedings of SIGIR 2004, Workshop on Geographic Information Retrieval, ACM Press, Sheffield, UK, 2004, 2 pages.

(56) References Cited

OTHER PUBLICATIONS

Song, Ruihua et al., "Learning Block Importance Models for Web Pages," WWW 2004, May, New York, ACM, 9 pages.

Sterling, Greg, "Search Engine Watch—Local Search: The Hybrid Future," Jan. 8, 2004, http://searchenginewatch.com/searchday/article.php/3296721, [last accessed Feb. 23, 2007].

Theodoridis, Yannis et al., "Efficient Cost Models for Spatial Queries Using R-Trees," IEEE Transactions on Knowledge and Data Engineering, vol. 12, No. 1, Jan./Feb. 2000, © 2000 IEEE, pp. 19-32.

Vaid, Subodh and Christopher B. Jones, "Spatially Indexing Text Documents," Report on Spatial Indexing Methods, Technical Report D12 2201, SPIRIT project, 2004, 37 pages.

Wang, Chuang et al., "Detecting Geographic Locations from Web Resources," GIR'05, Nov. 2005, Bremen, Germany, © 2005 ACM, pp. 17-24.

Wang, Chuang et al., "Web Resource Geographic Location Classification and Detection," WWW 2005, May 2005, Chiba, Japan, ACM, pp. 1138-1139.

Wang, Lee et al., "Detecting Dominant Locations from Search Queries," SIGIR'05, Aug. 2005, Salvador, Brazil, © 2005 ACM, 8 pages.

Yang, Yiming et al., "A Study of Approaches to Hypertext Categorization," Journal of Intelligent Information Systems, © Kluwer Academic Publishers, Boston, pp. 1-25.

Yokoji, Seiji et al., "Kokono Search: A Location Based Search Engine," WWW 10, Hong Kong, May 2001, 2 pages.

U.S. Appl. No. 12/539,555, filed Aug. 11, 2009, Wang et al.

Joachims, Thorsten, "Text Categorization with Support Vector Machines: Learning with Many Relevant Features," Machine Learning ECML-98, Lecture Notes in Computer Science, 1998, vol. 1398/1998, pp. 137-142.

\* cited by examiner

SELECTING ADVERTISEMENTS BASED ON SERVING AREA AND MAP AREA

BACKGROUND

Many users interact with various Internet-based services using mobile devices such as personal digital assistants ("PDAs") and cell phones. Common Internet-based services include map services, navigation services, and search services. A map service, which may be provided as a web service, provides maps of various locations as requested by users. For example, a user driving a vehicle may request using a cell phone that the map service provide a map of the surrounding area. The map service may determine the user's current location based on global positioning system ("GPS") coordinates provided by the cell phone and download a map of the surrounding area to the cell phone so that it can be displayed to the user. The map service may provide maps based on locations other than the user's current location. For example, a user may use a map service when planning a vacation in a distant city. In such a case, the map service provides a map of the distant city. The map service may be accessible by any computing device (e.g., a desktop computer) and not just mobile devices.

A navigation service provides directions for travel between locations. For example, a user driving a vehicle may use a PDA to specify a destination location and request that the navigation service provide directions from their current location to the destination location. The navigation service, after determining the user's current location (e.g., using GPS information), prepares the directions and downloads the directions to the user's PDA for presentation to the user. The directions may be in various formats. For example, the directions may be presented by highlighting a map or by providing a written or an audible list of turn instructions.

A search service may allow users to search for enterprises (e.g., retail outlets, governmental entities, and schools) that satisfy a search request or query. For example, a user driving a vehicle may use a PDA to request a search service to identify the restaurants that are nearby. The user may enter the query "nearby restaurants." The search service would identify restaurants that are near the user's current location and provide to the user's PDA a listing of those restaurants or a map indicating the locations of the restaurants.

Many Internet-based services, such as map services, navigation services, and search services, rely on advertising revenue as their sole source of revenue or to augment other sources of revenue. When a service receives a request, the service may provide advertisements along with the response to the request. A navigation service may provide advertisements that are in some way related to the destination location. For example, if the destination location is Washington, D.C., then the navigation service may provide advertisements for tour companies, restaurants, airlines, and so on that service Washington, D.C. A map service may similarly provide advertisements that are in some way related to the area of the map being displayed, and a search service may provide advertisements related to the search terms and the user's current location.

A difficulty, however, with providing advertisements that are in some way related to a location is that the advertisements are often ranked based on distance from the advertised service to the user's current location. For example, if a user in Seattle enters "nearby restaurants," a search service may identify advertisements for coffee outlets, fast-food outlets, and full-service restaurants that are within a five-mile radius of the user's current location. The search service may rank eight coffee outlets first because they are nearest to the user (e.g., within one mile of the user) and rank a coffee outlet that is two miles away higher than a restaurant that is three miles away. The user, however, is unlikely to be interested in a coffee outlet that is two miles away, but is likely to be interested in a restaurant that is three miles away. In such a case, the ranking based on distance would not necessarily reflect a correct ranking from the user's perspective. In addition, when a user is reviewing a map, a map service may provide advertisements for enterprises whose locations are not on the map. For example, a map service may provide an advertisement for a restaurant that is off the map. In such a case, the user may not have a good idea of how far away the restaurant is or how difficult it would be to get to the restaurant.

SUMMARY

Methods and systems for selecting advertisements to present to a user of a computing device are provided. An advertisement system selects advertisements to display to a user based on the serving area of the advertisements. The advertisement system may initially identify candidate advertisements to be provided to a user and then filter those advertisements based on serving area. The advertisement system may determine the "serving areas" of the candidate advertisements. The advertisement system selects those candidate advertisements whose serving area encompasses the user's current location for presentation to the user. The advertisement system may alternatively rank the candidate advertisements based on distance to serving area. The advertisement system can thus provide advertisements to users factoring in the serving areas of the advertisements.

The advertisement system may also select advertisements to present to a user based on a map area currently being displayed to the user. The advertisement system may initially identify candidate advertisements to be provided to a user and then filter those advertisements based on "provider location." The advertisement system then determines the provider locations of the candidate advertisements. The advertisement system then selects those candidate advertisements whose provider locations are within or encompassed by the map area that is currently being displayed to the user. The advertisement system can thus provide advertisements to users factoring in the areas of the maps currently being displayed to the users.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Methods and systems for selecting advertisements to present to a user of a computing device are provided. In one embodiment, an advertisement system selects advertisements to display to a user based on the serving area of the advertisements. The advertisement system may initially identify candidate advertisements to be provided to a user and then filter those advertisements based on serving area. For example, the advertisement system may take a query submitted by a user to a search service and submit that query to an advertisement search system. The advertisement search system searches for advertisements that are related to the submitted query. The advertisement system considers the related advertisements to be candidate advertisements. The advertisement system may then determine the "serving areas" of the advertisements. For example, the serving area of an advertisement for a coffee outlet may have a three-block radius centered at the coffee outlet while the serving area for a car dealership may have a 50-mile radius. The advertisement system may determine the serving area in various ways, such as from explicit metadata associated with advertisements or analyzing the content of the advertisements. The advertisement system then selects those candidate advertisements whose serving area encompasses the user's current location. For example, if the serving area of a small coffee outlet is two blocks and the serving area of a larger coffee outlet is five blocks and the user is located three blocks from the small coffee outlet and four blocks from the larger coffee outlet, the advertisement system would select the advertisement for the larger coffee outlet, but not the advertisement for the smaller coffee outlet even though the smaller coffee outlet is closer to the user. Alternatively, the advertisement system may rank the advertisements based on distance from the user's current location to the serving areas. For example, the advertisement system may rank advertisements whose serving areas encompass the user's current location first, followed by advertisements ordered based on distance from the user's current location to the perimeter of their serving areas. In this way, the advertisement system can provide advertisements to users factoring in the serving areas of the advertisements.

In one embodiment, the advertisement system selects advertisements to present to a user based on a map area currently being displayed to the user. The advertisement system may initially identify candidate advertisements to be provided to a user and then filter those advertisements based on "provider location." For example, the advertisement system may take a query submitted by a user to a search service and submit that query to an advertisement search system. The advertisement search system searches for advertisements that are related to the submitted query. The advertisement system considers the related advertisements to be candidate advertisements. The advertisement system may then determine the provider locations of the candidate advertisements. The provider location represents the physical location at which a service advertised by an advertisement is provided. For example, the provider location of an advertisement for a coffee outlet is the location of the outlet. The provider location of a bank may be a local branch office. The advertisement system may determine the provider location in various ways, such as from explicit metadata associated with the advertisements or analyzing the content of the advertisements. The advertisement system then selects those candidate advertisements whose provider locations are within or encompassed by the map area that is currently being displayed to the user. For example, if the map area is currently a one-mile square centered at the user's location and the location of a restaurant is two miles away from the user, then the advertisement system does not select an advertisement for the restaurant. If, however, the user requests to zoom out the map to a two-mile square, then the advertisement system would select the advertisement for the restaurant. In this way, the advertisement system can provide advertisements to users factoring in the areas of the maps currently being displayed to the users.

In one embodiment, the advertisement system selects advertisements to display to a user based on the current map area that a user is viewing and the serving area of the advertisements. The advertisement system initially identifies candidate advertisements to be provided to a user as described above. The advertisement system may then select candidate advertisements whose provider locations are within the current map area and whose serving areas encompass the user's current location. For example, if the current map area is a one mile square and the user's current location is in the center of the map area, then the advertisement system will select candidate advertisements whose provider location is within the one-mile square and whose serving area overlaps the center of the map area. The advertisement system, however, will not select candidate advertisements whose provider location is within the one-mile square but whose serving area does not overlap the center of the map area. Similarly, the advertisement system will not select candidate advertisements whose serving area overlaps the center of the map area but whose provider location is not within the one-mile square.

Figure 1:
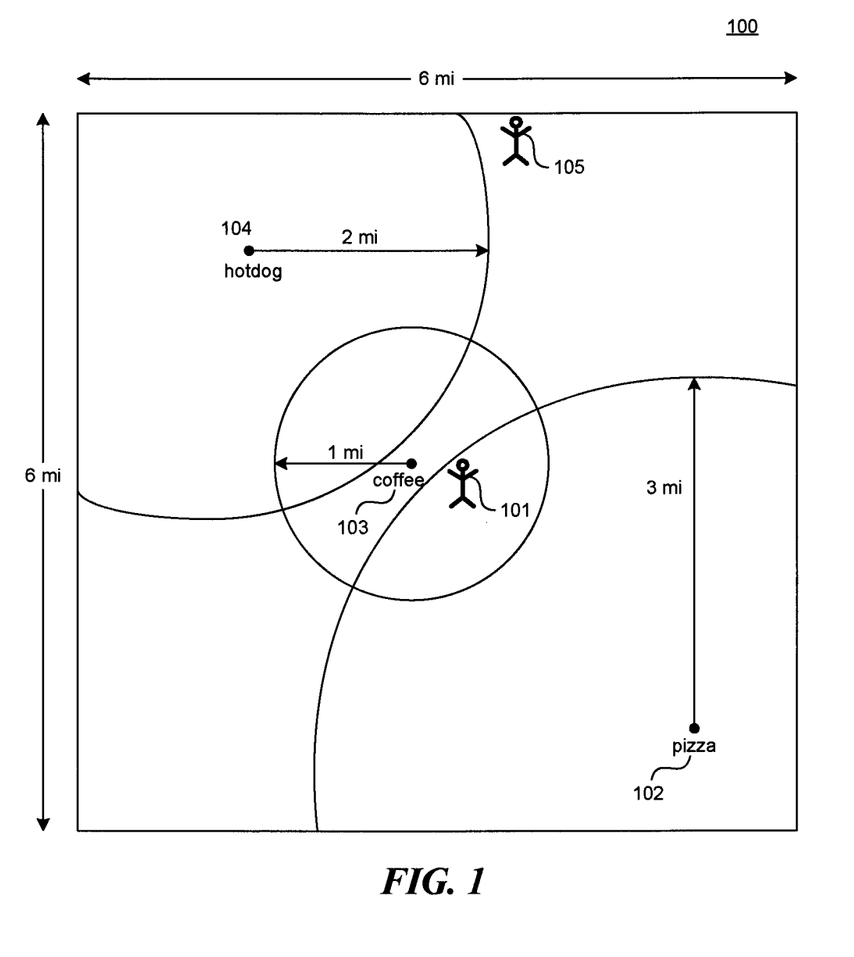
FIG. 1 illustrates the selecting of advertisements based on a serving area by the advertisement system in one embodiment.

FIG. 1 illustrates the selecting of advertisements based on a serving area by the advertisement system in one embodiment. A square 100 represents a six mile square centered on a user's current location 101. The advertisement system may initially identify three candidate advertisements to present to the user. These candidate advertisements include advertisements for a pizza parlor, a coffee outlet, and a hot dog stand. The provider location for the pizza parlor is location 102, the coffee outlet is location 103, and the hot dog stand is location 104. The serving area for the pizza parlor has a three-mile radius, the serving area for the coffee outlet has a one-mile radius and the serving area for the hot dog stand has a two-mile radius. The advertisement system selects the advertisements for the pizza parlor and the coffee outlet, but does not select the advertisement for the hot dog stand. The serving areas for the pizza parlor and the coffee outlet both encompass the user's current location, but the serving area for the hot dog stand does not, even though the hot dog stand is closer to the user's current location than the pizza parlor. Alternatively, if the user's current location was at location 105, none of the serving areas would encompass the user's current location. In such a case, the advertisement system may select all the advertisements and rank them based on distance to perimeter of their serving areas. In particular, the advertisement system would rank the advertisement for the hotdog stand first, followed by the advertisements for the coffee outlet and the pizza parlor.

Figure 2:
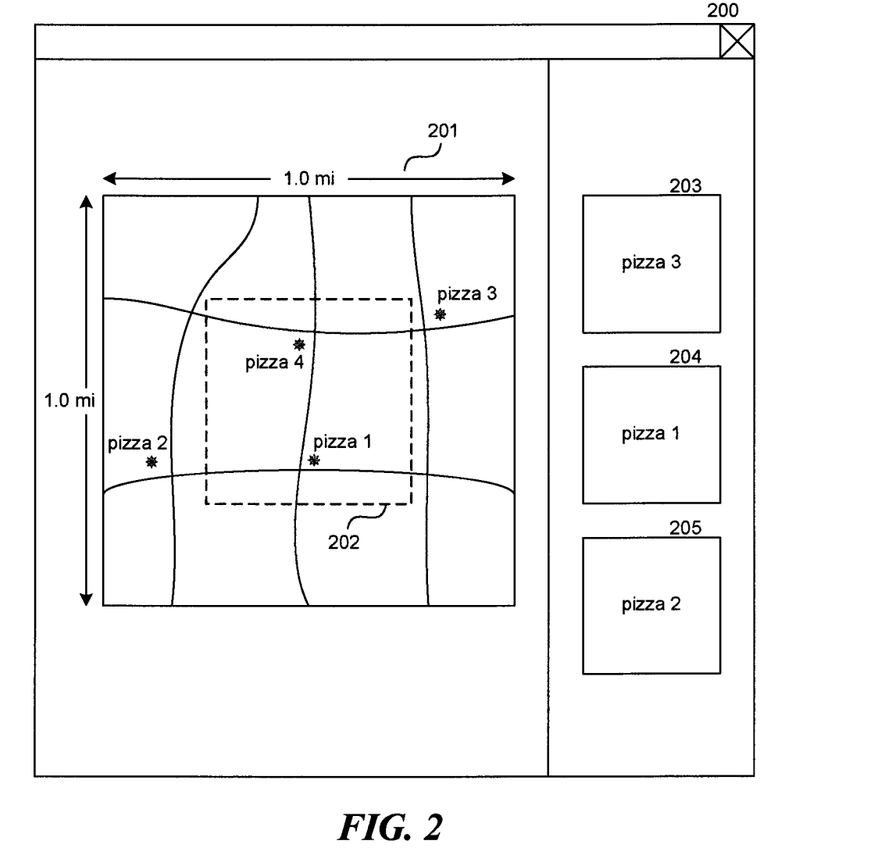
FIG. 2 illustrates the display of advertisements selected by the advertisement system based on map area in one embodiment.

FIG. 2 illustrates the display of advertisements selected by the advertisement system based on map area in one embodiment. Display page 200, which may be displayed on a mobile device, includes a map 201 and advertisements 203-205. The map represents a one-mile square. The map is currently displaying the location of pizza parlors 1-4 as represented by the asterisks. Since pizza parlors 1-4 are all within the map area, the advertisement system selected advertisements for all four pizza parlors; ranked them as pizza parlor 3, pizza parlor 1, pizza parlor 2, and pizza parlor 4; and then selected the three highest ranking advertisements because only three advertisement slots were available. If the user then selects to zoom in the map area, for example, to the area 202, then the advertisement system would re-select advertisements that are within the zoomed-in map area.

Figure 3:
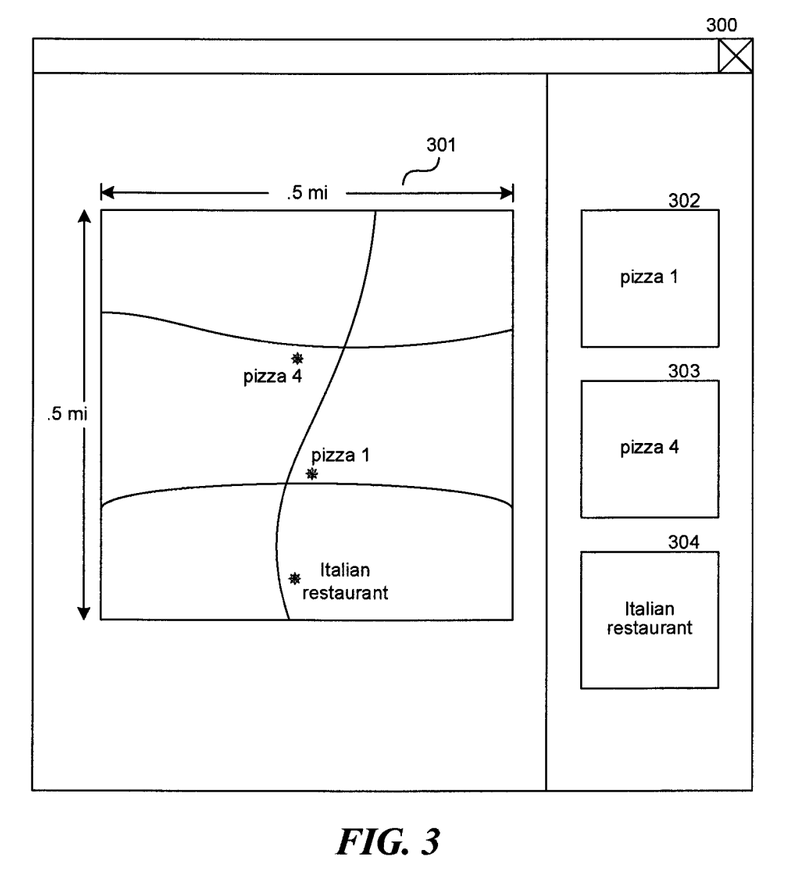
FIG. 3 illustrates the display of advertisements selected by the advertisement system based on a zoomed-in map area in one embodiment.

FIG. 3 illustrates the display of advertisements selected by the advertisement system based on a zoomed-in map area in one embodiment. Display page 300 includes a map area 301 that is a 0.5-mile square. The map area is currently displaying the location of three restaurants: pizza parlor 1, pizza parlor 4, and an Italian restaurant. Since the user zoomed in, pizza parlor 2 and pizza parlor 3 are no longer within the map area. In such a case, even though advertisements for pizza parlors 1-4 are candidate advertisements, the advertisement system selected only advertisements 302 and 303 for pizza parlor 1 and pizza parlor 4. Since only two of the candidate advertisements had a provider location within the map area, the advertisement system may have expanded the search for candidate advertisements resulting in an additional candidate advertisement for an Italian restaurant. Since the provider location of the Italian restaurant is within the map area, the advertisement system displayed an indication of its provider location and presented its advertisement 304.

Figure 4:
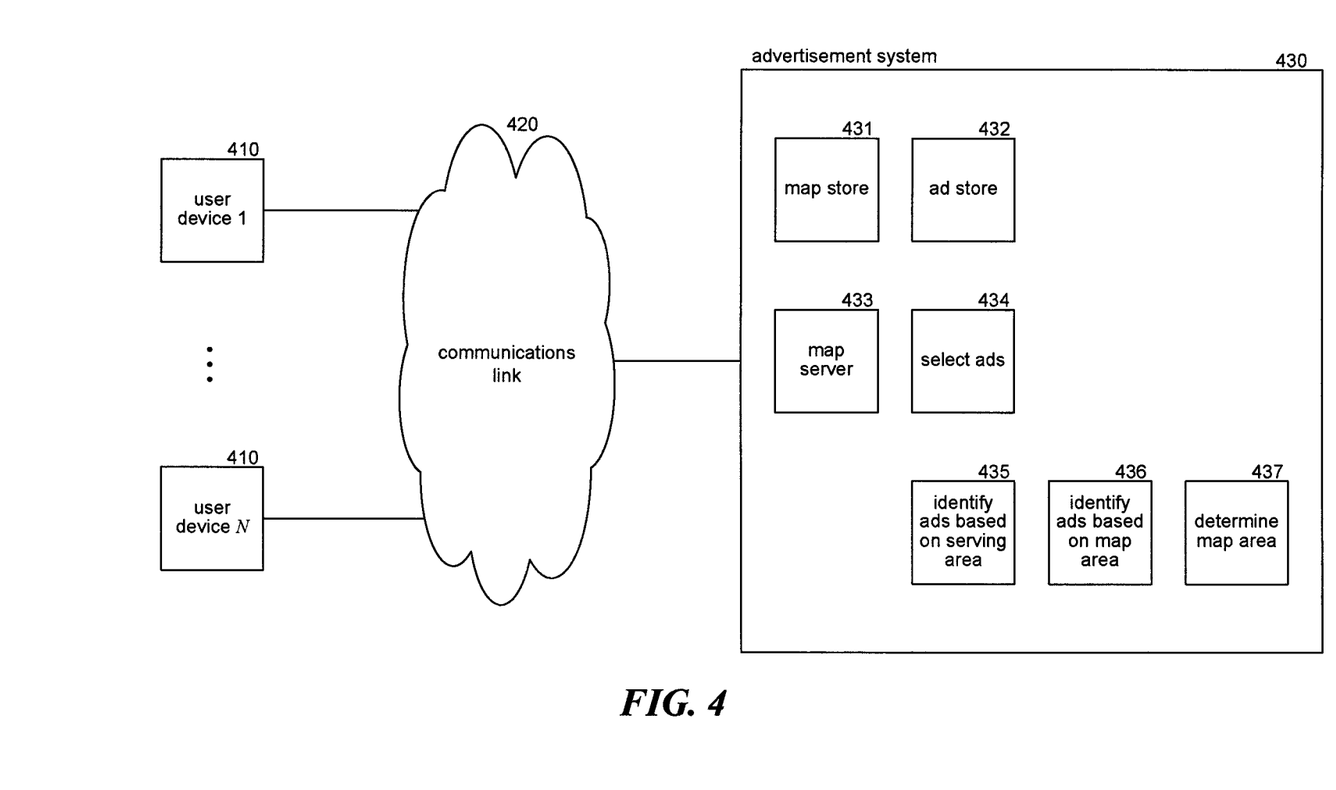
FIG. 4 is a block diagram that illustrates components of the advertisement system in one embodiment.

FIG. 4 is a block diagram that illustrates components of the advertisement system in one embodiment. The advertisement system 430 is connected to user devices 410 via communications link 420, which may be a wireless communications network. The advertisement system may work in conjunction with a map server 433 and a map store 431. The map server may receive requests from a user device to display a map of a specified area, retrieve the map from the map store, and then provide the retrieved map to the user device for presentation to the user. The map server may also identify advertisements that are to be presented to the user by interacting with the advertisement system. The advertisement system includes an advertisement store 432, a select advertisements component 434, an identify advertisements based on serving area component 435, an identify advertisements based on map area component 436, and a determine map area component 437. The select advertisements component receives a query for advertisements, searches for candidate advertisements, and then invokes either the identify advertisements based on serving area component or the identify advertisements based on map area component, or both, to identify which of the candidate advertisements are to be provided to the user. The determine map area component determines the area of the map currently being displayed to the user.

The computing device on which the advertisement system is implemented may include a central processing unit, memory, input devices (e.g., keyboard and pointing devices), output devices (e.g., display devices), and storage devices (e.g., disk drives). The memory and storage devices are computer-readable media that may contain instructions that implement the advertisement system. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the advertisement system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computing devices that interact with the advertisement system may be cell phones, personal digital assistants, smart phones, personal computers, programmable consumer electronics, digital cameras, and so on.

The advertisement system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the advertisement system may be implemented on a computer system separate from the map service, the navigation service, or other services for which it provide advertisements.

The advertisement system may include or interact with systems that determine the provider locations and serving areas of advertisements. Various techniques for determining provider locations and serving areas are described in U.S. patent application Ser. No. 11/081,014, now U.S. Pat. No. 7,574,530 issued Aug. 11, 2009, entitled "Method and System for Web Resource Location Classification and Detection," and U.S. patent application Ser. No. 11/277,704, now U.S. Pat. No. 7,606,875 issued Oct. 20, 2009, entitled "Detecting Serving Area of a Web Resource," which are both hereby incorporated by reference. For example, the advertisement system may interact with a location system that determines the serving area of a web resource (e.g., web site of the business being advertised) based on addresses (e.g., IP addresses) of users who access the web resource. The location system may identify the accesses to a web resource by analyzing web access information such as web access logs, click-through logs, and so on. A web access log may be generated by a web site and may contain an entry for each access by a user to the web site. Each entry may include the IP address of the user. A click-through log may be generated by a search engine and may contain an entry for each selection of a reference to the web site that is included in a query result, commonly referred to as a "click-through." The location system retrieves the IP addresses from the web access information and then determines the geographic locations associated with the IP addresses. Many commercial products are available that provide mappings from IP addresses to geographic locations, such as IP2Location by Hexasoft Development and GeoPoint by Quova Corp. After the location system identifies the locations of each user access to the web site, it analyzes the identified locations to determine the serving area of the web resource. The location system may use a hierarchy of locations such as one organized by continent, country, state, and city. The location system may select locations for the serving area based on the number of accesses of the web resource by users within the location and based on a distribution of the number of accesses of the web resource by users within locations that are hierarchically within the location.

Alternatively, a location system may determine the serving area of a web site of a provider of an advertisement based on the business category of the web site and a "provider location" associated with the web site. The location system may determine the category of a web site by providing the content of the web site to a classifier that has been trained to classify a web site by business category based upon its content. For example, the business categories may include banking services, transportation services, restaurants, and so on. The location system defines a scope for each business category that indicates the typical size of the serving area for web sites within that business category. For example, a web site for banking services or a restaurant may provide services to users that are typically within the same city. A web site for an airport, in contrast, may provide services to users in a broader area, such as within the same state. A web site for a software development company may provide services to users in a yet broader area, such as within the same country. Thus, the location system may represent the scope as a city, state, or country. Alternatively, the location system may represent scope by a radius (e.g., 10 miles for a restaurant and 100 miles for an airport). To determine the serving area for a web site, the location system analyzes the web site to identify the provider location. A provider location identifies the geographic location of the entity (e.g., organization, corporation, or person) that provides the web resource. The provider location usually is a sequential address string including street address, city name, state name, zip code, country, and so on. For example, the provider location of a web site provided by a certain company may be the address of the corporate headquarters of the company. The location system then represents the serving area for the web site as the scope associated with the identified provider location.

Figure 5:
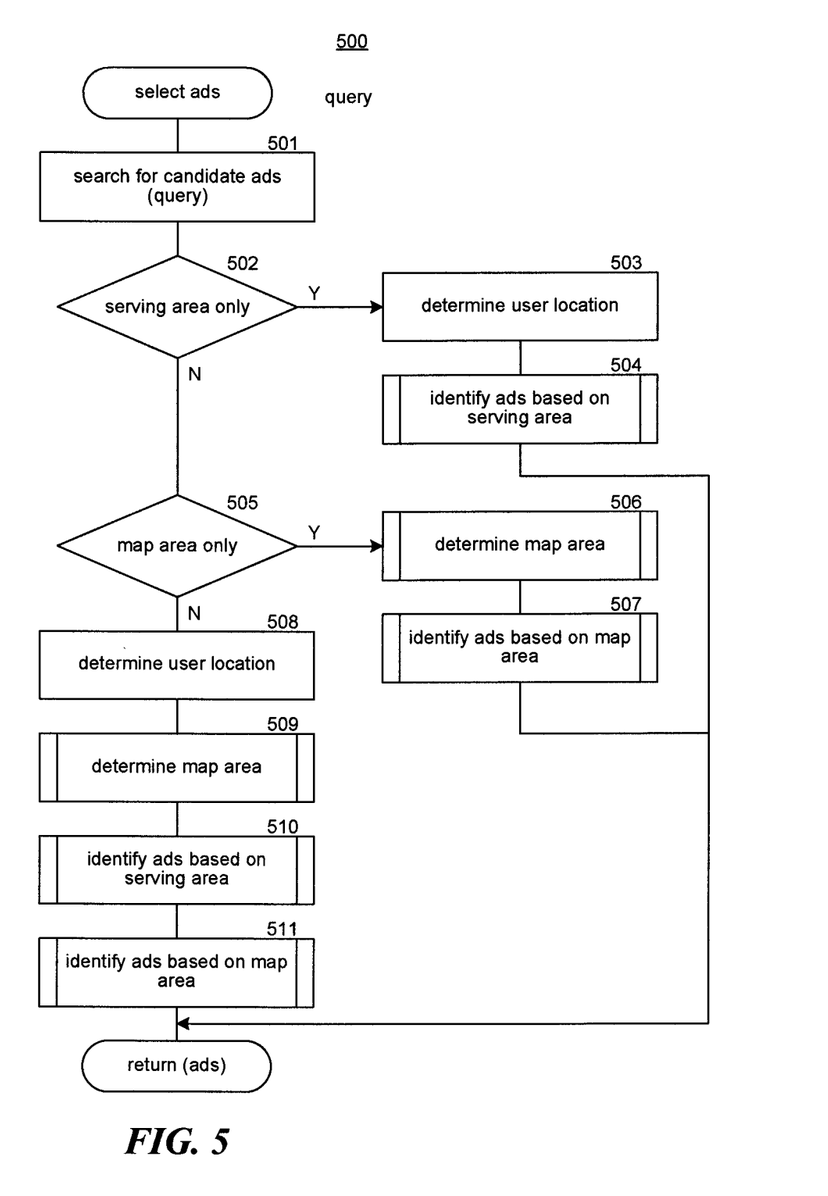
FIG. 5 is a flow diagram that illustrates the processing of the select advertisements component of the advertisement system in one embodiment.

FIG. 5 is a flow diagram that illustrates the processing of the select advertisements component of the advertisement system in one embodiment. The component 500 receives a query, searches for candidate advertisements, and identifies advertisements based on the serving area of the advertisements or the map area currently being displayed to a user. In block 501, the component searches for candidate advertisements that match the query. In decision block 502, if the component is to select advertisements based on serving area only, then the component continues at block 503, else the component continues at block 505. In block 503, the component determines the user's current location. In block 504, the component invokes the identify advertisements based on serving area component passing the user location and the candidate advertisements. The component then returns the identified advertisements as the selected advertisements. In decision block 505, if the component is to select advertisements based on map area only, then the component continues at block 506, else the component continues at block 508. In block 506, the component invokes the determine map area component to determine the map area that is currently being displayed to the user. In block 507, the component invokes the identify advertisements based on map area component passing the map area and the candidate advertisements. The component then returns the identified advertisements as the selected advertisements. In blocks 508-511, the component identifies advertisements based on both serving area and map area. In block 508, the component determines the user's current location. In block 509, the component invokes the determine map area component to determine the map area currently being displayed to the user. In block 510, the component invokes the identify advertisements based on serving area component passing the serving area and the candidate advertisements. In block 511, the component invokes the identify advertisements based on map area component passing the map area and the advertisements identified based on the serving area. The component then returns the identified advertisements as the selected advertisements. The select advertisements component may be invoked whenever the user location changes or whenever the map area changes such as when the user changes the resolution of the map by zooming in or out.

Figure 6:
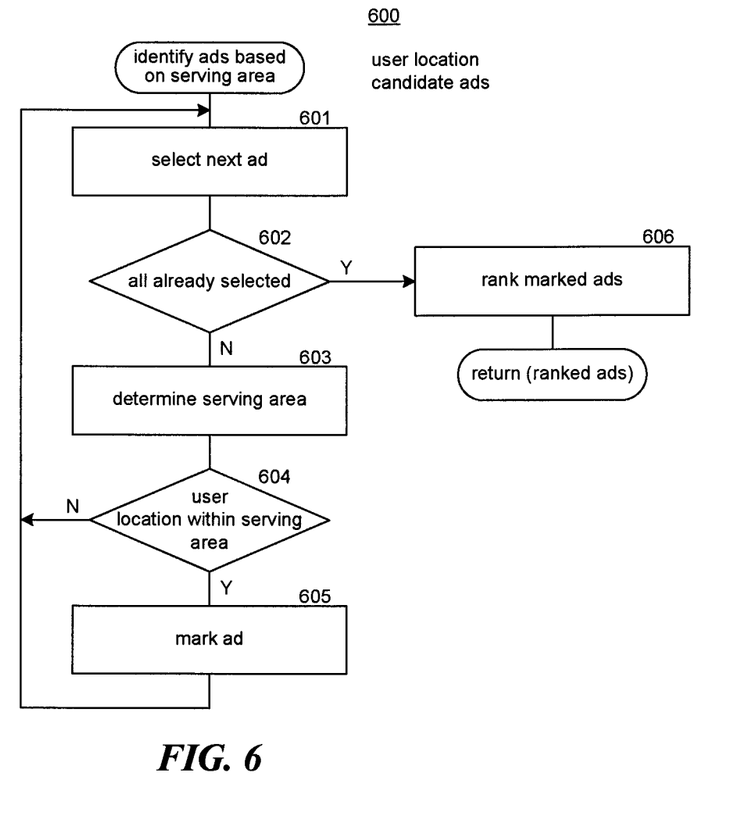
FIG. 6 is a flow diagram that illustrates the processing of the identify advertisements based on serving area component of the advertisement system in one embodiment.

FIG. 6 is a flow diagram that illustrates the processing of the identify advertisements based on serving area component of the advertisement system in one embodiment. The component 600 is passed a user location and candidate advertisements. In block 601, the component selects the next candidate advertisement. In decision block 602, if all the candidate advertisements have already been selected, then the component continues at block 606, else the component continues at block 603. In block 603, the component determines the serving area of the selected candidate advertisement. In decision block 604, if the user location is within the serving area of the selected advertisement, then the component continues at block 605, else the component loops to block 601 to select the next candidate advertisement. In block 605, the component marks the selected advertisement as having a serving area that encompasses the user location and then loops to block 601 to select the next advertisement. In block 606, the component ranks the marked advertisements and then returns the ranked advertisements as the identified advertisements. The advertisement system may use various techniques for ranking advertisements. For example, the advertisements may be ranked based on popularity of the web sites of the advertised businesses, on how closely the keywords of the advertisement match terms of the query, on how much the advertiser is willing to pay for placing the advertisement, on distance between the provider location and the user location, or distance between the perimeter of the serving area and the user location when the serving area does not encompass the user location, and so on, as well as various combinations of these ranking techniques.

Figure 7:
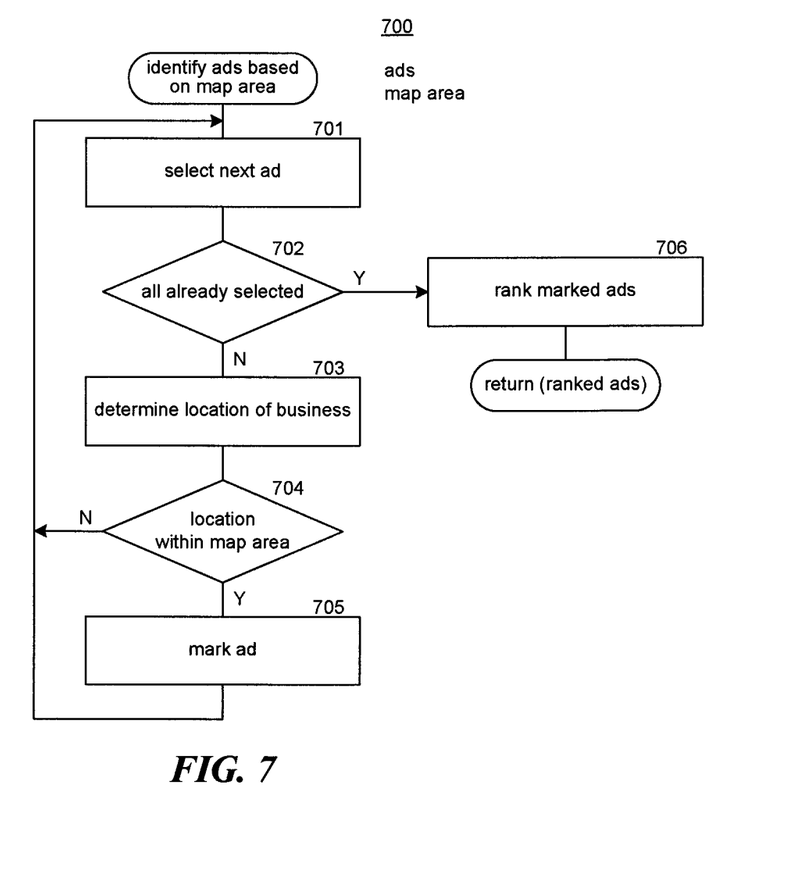
FIG. 7 is a flow diagram that illustrates the processing of the identify advertisements based on map area component of the advertisement system in one embodiment.

FIG. 7 is a flow diagram that illustrates the processing of the identify advertisements based on map area component of the advertisement system in one embodiment. The component 700 is passed candidate advertisements and a map area. In block 701, the component selects the next candidate advertisement. In decision block 702, if all the candidate advertisements have already been selected, then the component continues at block 706, else the component continues at block 703. In block 703, the component determines the provider location of the selected candidate advertisement. In decision block 704, if the provider location is within the map area, then the component continues at block 705, else the component loops to block 701 to select the next candidate advertisement. In block 705, the component marks the selected candidate advertisement as having a provider location within the map area and then loops to block 701 to select the next candidate advertisement. In block 706, the component ranks the marked advertisements. The component then returns the ranked advertisements as the identified advertisements.

Figure 8:
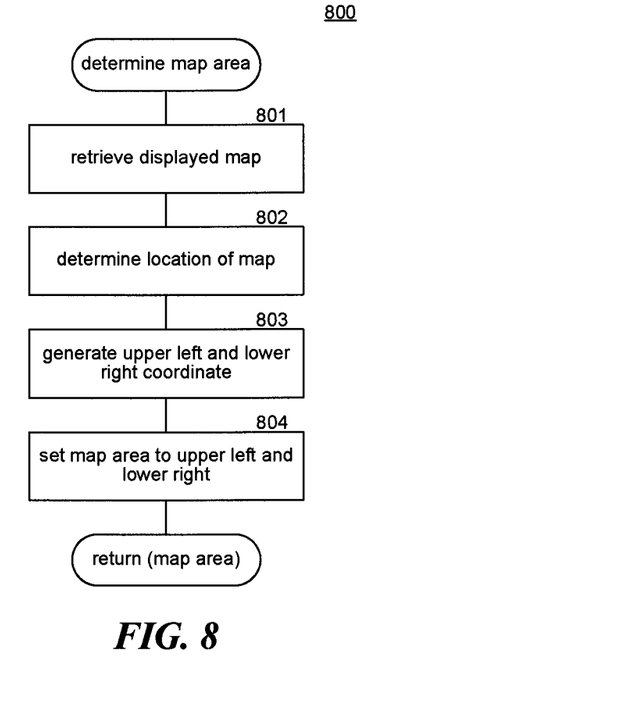
FIG. 8 is a flow diagram that illustrates the processing of the determine map area component of the advertisement system in one embodiment.

FIG. 8 is a flow diagram that illustrates the processing of the determine map area component of the advertisement system in one embodiment. The component 800 determines the map area currently being displayed to a user. In block 801, the component interacts with the map server to retrieve information on the displayed map. In block 802, the component determines the location of the displayed map. In block 803, the component generates an upper left and lower right coordinate for the map. In block 804, the component sets the map area to the upper left and lower right coordinates. The component then returns the map area.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, one skilled in the art will appreciate that if too few candidate advertisements are selected for presentation, the advertisement system could relax the query used to identify candidate advertisements or expand the serving area of the advertisements. Accordingly, the invention is not limited except as by the appended claims.

We claim:

1. A computer system for selecting advertisements to present to a user of a computing device, the system comprising:
    a memory;
    a processor;
    a component that provides a user location of the user;
    an advertisement data store having advertisements, each advertisement having a serving area, the serving area of an advertisement representing geographic distribution of users who are interested in the advertisement; and
    a component that ranks advertisements to be presented to the user based on serving areas of the advertisements and proximity of the user location to perimeters of the serving areas of the advertisements such that the rank of an advertisement whose serving area does not encompass the user location is based on a distance of the user location to a perimeter of the serving area for the advertisement
    wherein the memory stores computer-executable instructions of the components and the processor executes the computer-executable instructions stored in the memory.

2. The computer system of claim 1 wherein the component that provides a user location determines the user location based on information provided by a mobile device.

3. The computer system of claim 1 including a component that receives a user query, searches for candidate advertisements that match the query, and stores indications of the candidate advertisements in the advertisement data store.

4. The computer system of claim 1 including a component that marks an advertisement as being selected when the user location is within the serving area of the advertisement.

5. The computer system of claim 1 wherein the component that ranks advertisements factors in whether a serving area of an advertisement encompasses the user location.

6. The computer system of claim 1 including a component that determines the serving area of an advertisement based on geographic locations of users who had previously selected the advertisement based on analysis of a click-through log indicating the users that previously selected the advertisement.

7. The computer system of claim 1 including a component that determines the serving area of an advertisement based on a categorization of a service advertised by the advertisement.

8. A computer system for selecting advertisements to present to a user of a computing device, the system comprising:
    a memory;
    a processor;
    a component that provides a user location of the user;
    an advertisement data store having advertisements, each advertisement having a serving area;
    a component that ranks advertisements based on their serving areas, wherein the component that ranks advertisements factors in distance to perimeter of serving area for an advertisement whose serving area does not encompass the user location such that an advertisement that is closer to the perimeter of the serving area is ranked higher than an advertisement that is farther from the perimeter of the serving area; and
    a component that presents the advertisement to the user in an order based on the ranks of the advertisements such that an advertisement is presented to the user even though the user location is not within the serving area of that advertisement
    wherein the memory stores computer-executable instructions of the components and the processor executes the computer-executable instructions stored in the memory.

9. A computer system for selecting advertisements to present to a user of a computing device, the system comprising:
    a memory;
    a processor;
    a component that provides a map area for the user, the map area indicating an area of a map currently displayed to the user;
    an advertisement data store having advertisements, each advertisement having a provider location and a serving area, the provider location of an advertisement representing a geographic location of the provider that provides a service advertised by advertisement, the serving area of an advertisement representing geographic distribution of users who are interested in the service advertised by the advertisement; and
    a component that marks an advertisement as being selected when both the provider location of the advertisement is within the map area and the serving area of the advertisement overlaps the center of the map area
    wherein the memory stores computer-executable instructions of the components and the processor executes the computer-executable instructions stored in the memory.

10. The computer system of claim 9 wherein as the map area displayed to the user changes to cover a new map area, the component that marks advertisements marks the advertisements based on the new map area.

11. The computer system of claim 9 wherein as the user changes resolution of the map to cover a new map area, the component that marks advertisements marks the advertisements based on the new map area.

12. The computer system of claim 9 including a component that receives a user query, searches for candidate advertisements that match the query, and stores indication of the candidate advertisements in the advertisement data store.

13. The computer system of claim 9 including a component that determines the provider location of an advertisement by submitting the advertisement to a classifier for classifying locations of advertisements.

14. The computer system of claim 9 including a component that determines the serving area of an advertisement based on geographic locations of users who had previously selected the advertisement based on analysis of a click-through log indicating the users that previously selected the advertisement.

15. A computer system for selecting advertisements to present to a user of a computing device, the system comprising:
    a memory;
    a processor;
    a component that receives from the user a user query, searches for candidate advertisements that match the query, and stores indications of the candidate advertisements;

a component that provides a map area for the user;
a component that provides a user location of the user;
an advertisement data store having the indications of the candidate advertisements, each advertisement having a provider location and a serving area, the provider location of an advertisement representing a geographic location of a provider that provides a service advertised by advertisement, the serving area of an advertisement representing geographic distribution of users who are interested in the service advertised by the advertisement; and
a component that marks an advertisement as being selected when the user location is within the serving area of the advertisement and the provider location of the advertisement is within the map area
wherein the memory stores computer-executable instructions of the components and the processor executes the computer-executable instructions stored in the memory.

16. The computer system of claim 15 wherein the component that provides the map area determines the map area based on a map currently displayed to the user.

17. The computer system of claim 16 wherein the component that provides a user location determines the user location based on information provided by a mobile device.

18. The computer system of claim 15 including a component that determines the serving area of an advertisement based on geographic locations of users who had previously selected the advertisement based on analysis of a click-through log indicating the users that previously selected the advertisement.

\* \* \* \* \*